Aug. 29, 1967  J. V. M. DE BONA  3,338,424
MOBILE CRANE

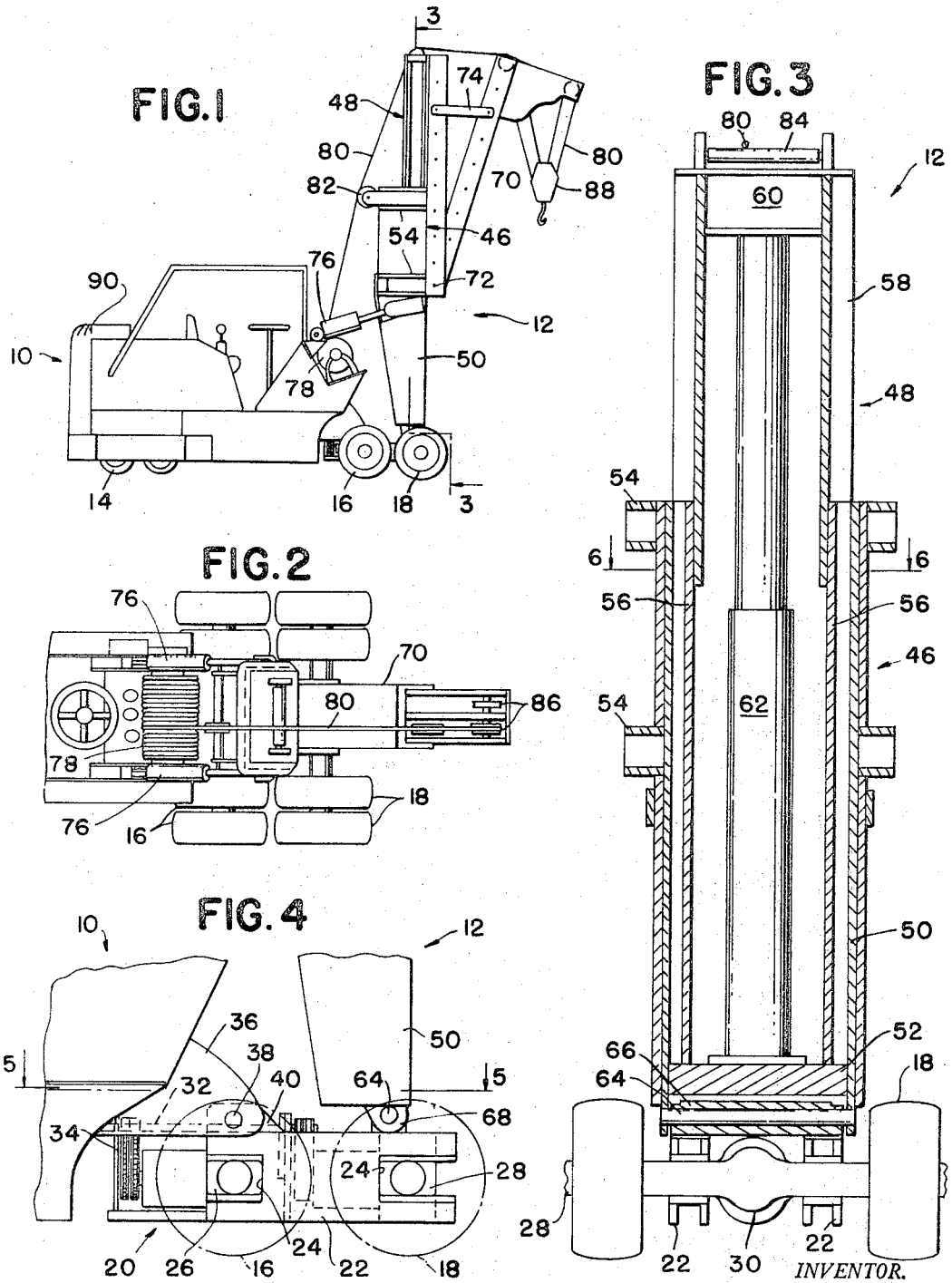

Filed Sept. 19, 1966  2 Sheets-Sheet 2

INVENTOR.
JOHN V. M. DeBONA
BY Whittemore,
Hulbert & Belknap
ATTORNEYS

3,338,424
MOBILE CRANE
John V. M. De Bona, Orchard Lake, Mich., assignor to Darin & Armstrong, Inc., Detroit, Mich., a corporation of Michigan
Filed Sept. 19, 1966, Ser. No. 580,267
8 Claims. (Cl. 212—8)

This invention relates to a mobile crane and has particular reference to an improved lift truck and crane combination having increased mobility and load carrying capabilities.

Conventional lift trucks are limited in load carrying capacity by the strength of the front axle and the tendency of the truck to pivot forward about the front axle when lifting a load. Additionally, a conventional lift truck is poorly adapted to carry loads over uneven or soft terrain because of the usual fixed position of the drive wheels thereof whereby traction of the drive wheels may be lost on rough or soft terrain.

Accordingly, an object of the invention is to provide improved mobile crane structure.

Another object of the invention is to provide a mobile crane having a crane unit, supported by two tandem drive wheel and axle assemblies, and a drive truck constructed and arranged so that the drive truck will load one of the two drive wheel and axle assemblies to provide traction therefor and the crane and the load carried by the crane will primarily load the other drive wheel and axle assembly to provide traction for it, thereby permitting walking of the loaded mobile crane over soft or uneven terrain.

Other objects and features of the invention will become apparent as the description proceeds, especially when taken in conjunction with the accompanying drawings illustrating a preferred embodiment of the invention, wherein:

FIGURE 1 is a side view of a mobile crane constructed according to the invention.

FIGURE 2 is an enlarged partial top view of the mobile crane shown in FIGURE 1.

FIGURE 3 is an enlarged sectional view of the mobile crane illustrated in FIGURE 1 taken substantially on the line 3—3 in FIGURE 1.

FIGURE 4 is an enlarged view of the drive wheel portion of FIGURE 1.

Figure 6:
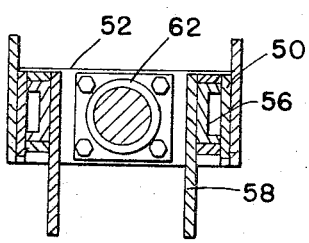
FIGURE 6 is a sectional view of the crane unit of the mobile crane illustrated in FIGURE 1 taken along the line 6—6 of FIGURE 3.
Figure 5:
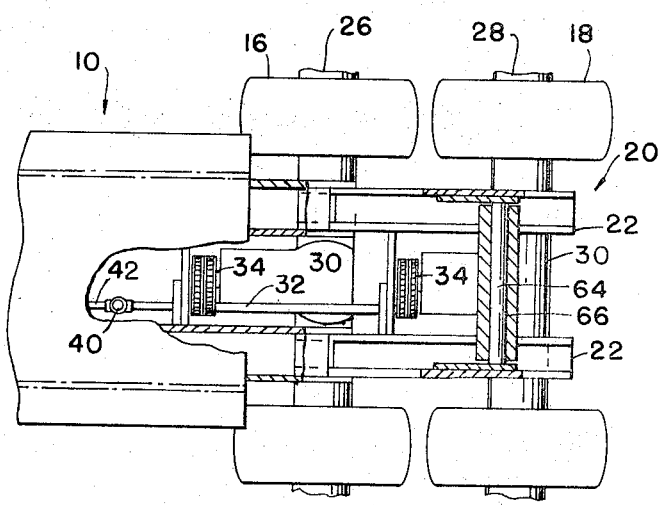
FIGURE 5 is a partially broken away sectional view of the drive wheel portion of the mobile crane illustrated in FIGURE 1 taken substantially on the line 5—5 of FIGURE 4.

As shown in the drawings, a mobile crane according to the invention includes a drive truck 10 with crane unit 12 at one end thereof. Steering wheels 14 are provided at the other end of drive truck 10. Drive wheels 16 and 18 are carried by a crane chassis 20 located beneath the crane unit 12 and at the front of drive truck 10. The drive wheels 16 and 18 are powered by a drive motor and transmission carried by truck 10.

The crane chassis 20 includes beam members 22 each of which has cutout portions 24 in each end thereof for receiving the drive axle assemblies 26 and 28 on which drive wheels 16 and 18 are mounted. Each axle assembly is provided with a differential 30 and is connected to the drive shaft 32 carried by the chassis 20 by means of a chain drive 34. The crane chassis 20 is connected to mounting flanges 36 at the front end of the truck 10 by a horizontally oriented pivot pin 38 which, as shown best in FIGURE 4, extends through flanges 40 of beam members 22 so that the crane chassis 20 is free to pivot about the axis of pin 38 relative to the truck 10. The pivot joint connection between crane chassis 20 and truck 10 is located above the axis of drive axle assembly 26 so that this assembly is loaded by the weight of the drive truck independent of the orientation of the crane chassis relative to the truck.

The crane chassis drive shaft 32 is connected to the drive motor carried by truck 10 through universal joint 40 and a second drive shaft 42 which permit transmission of power to the drive axle assemblies 26 and 28 while the crane chassis 20 pivots relative to the truck. The drive axle assemblies 26 and 28 are identical and the drive wheels 16 and 18 are of the same diameter and cooperate in driving the mobile crane over the ground.

The crane unit 12 includes a support 46 which telescopically houses mast 38. The support includes vertically extending side walls 50 secured together by a base plate 52 at the lower end of the support and by beams 54 extending around the outside of the support at the upper end thereof. U-shaped guide rails 56 are secured to the inside of side wall 50 and fit within the U-shaped mast beams 58. Beams 58 are joined together at the upper ends thereof by a transverse beam 60. A hydraulic cylinder 62 is mounted between the base plate 52 and beam 60 and is operable to extend the mast 48 upwardly relative to the support 46. The crane unit 12 is connected to the crane chassis 20 by a horizontally oriented pivot pin 64 which extends through weld plate 66 of chassis 20 and flanges 68 on the side wall 50. Pin 64 is located above drive axle assembly 28.

A boom 70 is mounted on mast 48 by a link and pivot connection 72, 74 as shown in FIGURE 1. A pair of hydraulic power cylinders 76 for holding the crane unit upright are mounted between the truck 10 and crane unit 12 at a point above the crane chassis 20. Power cylinders 76 are extendable to rotate the unit 12 relative to the truck. A winch 78 with cable 80 wrapped thereon is mounted on truck 10 with the cable extending upwardly past idler 82, over cable roller 84 at the top of the mast 58 and over boom pulley 86 to lifting block 88.

When in use the mobile crane is positioned adjacent the load and the power cylinders 76 may be adjusted to rotate the crane unit 12 about pivot shaft 64 so that the block 88 is above the load. The power cylinder 62 may then be adjusted to raise or lower mast 48 so that the desired lift can be obtained. The block 88 may then be lowered for engagement with the load by unwinding the cable 80 from winch 78. After the load has been lifted by rewinding the cable onto the winch, the mobile crane may be driven to the desired position for unloading.

The pivot connection between the crane unit 12 and the crane chassis 20 is located above and slightly inwardly toward the truck of the axis of rotation of the drive axle 28 so that the downward force of the load carried by the crane loads the drive wheels 18 and to some lesser extent the drive wheels 16 and provides additional traction for the mobile crane. As illustrated in FIGURE 2, the crane is provided with dual wheels for each of the axle assemblies 26 and 28 to distribute the load and assure maximum traction.

When the mobile crane carries the load over uneven ground the crane chassis 20 will rotate about pin 38 relative to the truck 10. As it is driven up an incline and the crane chassis 20 is tilted upwardly relative to the truck 10 the compound rotation of the crane unit 12 relative to the truck 10 moves the upper end of the unit 12 away from the truck so that the load dependent from block 88 does not swing in and contact the crane.

The lifting and load carrying capacity of the mobile crane according to the invention is larger than that of a comparable lift truck having a conventional single front axle which is loaded by both the lift truck and the load carried thereby. With a conventional lift truck the load capacity is limited by the capacity of the single axle and by the tendency of the truck to pivot about the front axle when too heavy a load is lifted. In a mobile crane as described the load lifting capacity is increased by distributing the weight of the drive truck 10 and the load between the two front axle assemblies 26 and 28. By use of dual front and rear axle assemblies it is possible to mount a heavy counterbalance weight 90 on the rear of the truck 10 to counterbalance the tendency of the mobile crane to pivot forward when loaded. Since the weight of the truck 10 is carried substantially entirely by steering wheels 14 the additional counterbalance weight does not load the axle assembly 28 which is free to support the work load.

The positioning of the pivot pins 38 and 64 above the axes of the drive axle assemblies 26 and 28 respectively results in a direct transmittal of the loading force from the truck 10 and from the crane and load to the drive wheels 16 and 18 to improve traction as the loaded crane is moved. The pivot pins are located substantially immediately above the axle assemblies so that the small angle of tilt of the chassis 20 during movement over uneven terrain does not substantially reduce the loading force exerted on the drive wheels. By utilizing a tandem assembly as disclosed it is possible to drive the loaded mobile crane across terrain which could not be traversed by a loaded conventional lift truck.

While one embodiment of the present invention has been considered in detail, it will be understood that other embodiments and modifications are contemplated. It is the intention to include all embodiments and modifications as are defined by the appended claims within the scope of the invention.

What I claim as my invention is:

1. A mobile crane comprising a truck having a power supply thereon, a crane chassis positioned at one end of said truck and including first and second drive wheels arranged in tandem with the first drive wheel positioned adjacent the one end of the truck and the second drive wheel positioned outwardly therefrom, a crane unit extending upwardly from the chassis, a first horizontally oriented pivot joint located above the axis of the first drive wheel connecting the crane chassis to the one end of the truck so that the one end of the truck is supported by the first drive wheel, a second horizontally oriented pivot joint connecting the lower end of the crane unit to the crane chassis and located above the axis of the second drive wheel so that the crane unit is supported by the second drive wheel, and link means above the crane chassis for pivotally connecting the crane unit to the truck.

2. Structure as set forth in claim 1 and further including drive means connecting the power supply with both the first and second drive wheels for rotating the same and for driving the mobile crane and permitting rotation of the crane chassis about the first pivot joint as the mobile crane is driven over uneven terrain.

3. A mobile crane as in claim 2 wherein each drive wheel forms a part of one of a pair of tandem axle and drive wheel assemblies carried by the crane chassis, each of the assemblies including spaced drive wheels, an axle shaft and a differential, the drive means being connected to each differential so as to rotate the drive wheels of each assembly.

4. A mobile crane as in claim 3 wherein the drive means includes a first drive shaft carried by the truck, a second drive shaft carried by the crane chassis, the first drive shaft being connected to the power supply and the second drive shaft being connected to each of the differentials, and a universal joint connection between the first and second drive shafts to permit rotation of the crane chassis relative to the truck about the first pivot joint.

5. A mobile crane as in claim 1 wherein the link means comprises an extendable power cylinder operable to vary the orientation of the crane unit in relation to the truck.

6. A mobile crane as in claim 1 wherein the crane unit includes a support, a mast telescopically carried by the support, a boom extending outwardly from the mast, lifting means secured to the outer end of the boom, power means for extending the mast, a power winch mounted on the truck, and a cable wrapped around the winch and running to the crane unit, over the top of the mast and connected to the lifting means.

7. A mobile crane as in claim 3 wherein the axes of the two assemblies and the axes of the first and second pivot joints are all parallel and wherein each assembly is located substantially immediately beneath one of the joints and the assemblies are spaced apart from each other a distance slightly greater than the sum of the radii of a drive wheel of each of the assemblies.

8. A mobile crane as in claim 7 wherein the drive wheels are all of the same radius.

References Cited

UNITED STATES PATENTS

| | | | |
|---|---|---|---|
| 2,096,186 | 10/1937 | Le Tourneau | 212—8 |
| 2,782,939 | 2/1957 | Bernaerts | 212—8 |

EVON C. BLUNK, *Primary Examiner.*

H. HORNSBY, *Assistant Examiner.*